June 19, 1956
R. E. RUSKIN ET AL
2,750,798
TRUE AIR SPEED METER
Filed Aug. 12, 1952
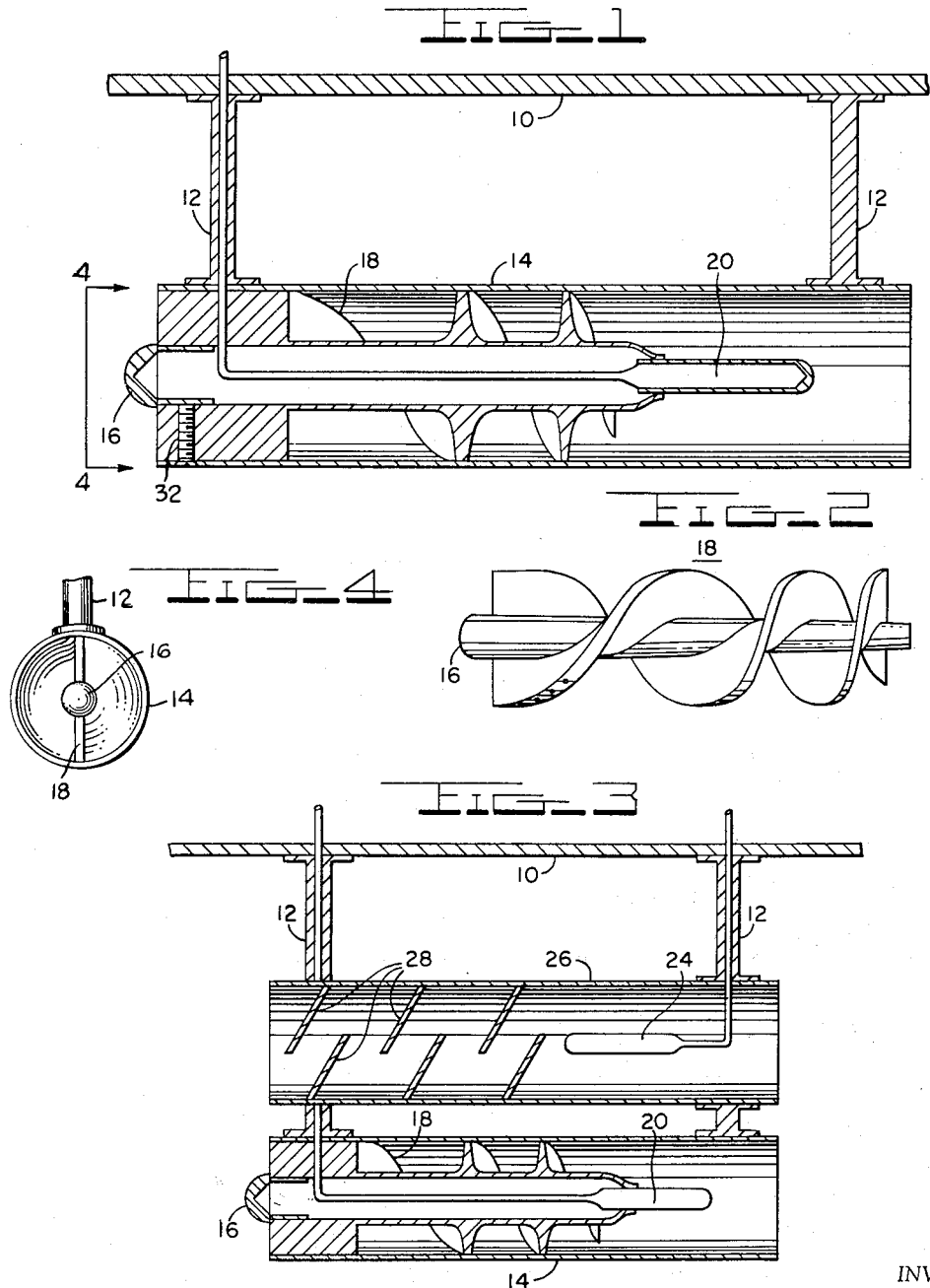
INVENTORS
ROBERT E. RUSKIN
ROBERT D. MERRILL
BY
ATTORNEYS

United States Patent Office 2,750,798
Patented June 19, 1956

2,750,798

TRUE AIR SPEED METER

Robert E. Ruskin, Washington, D. C., and
Robert D. Merrill, Rome, N. Y.

Application August 12, 1952, Serial No. 304,052

7 Claims. (Cl. 73—204)

(Granted under Title 35, U. S. Code (1952), sec. 266)

This invention relates to an axial flow vortex thermometer that is specially designed for use with aircraft for measuring the temperature of the air through which an aircraft travels, and also provides a means for determining the true air speed of the aircraft involved.

The device that comprises the present invention utilizes a physical phenomenon known as the "Ranque effect." The Ranque effect provides refrigeration of a vortically rotated fluid at the center of a vortex due to expansion at that point caused by the centrifugal force in the vortex. The present invention utilizes a helical vane system for providing nearly uniform rotational acceleration to air passing axially through a housing member such that the air whose temperature is being measured forms a vortex of controlled characteristics. The cooling of the air at the center of the vortex due to the Ranque effect is controlled to counterbalance the dynamic heating effect of the air through which the aircraft travels.

Vortex thermometers presently used embody a housing, a thermometer located in the housing and an air scoop disposed to produce a tangential flow of incoming air through the housing. This arrangement causes a turbulence in the incoming air, thereby causing the air whose temperature is being measured to become warmer at higher aircraft velocities. Thus when aircraft are traveling at speeds on the order of 350 miles an hour, errors greater than 0.5 degree centigrade are introduced due to the turbulence caused by the tangential flow of air being converted to a vortical, axial flow, unless these tangential flow vortex thermometers are so adjusted as to provide errors of low temperature readings at lower air speeds. Another disadvantage of the tangential flow type of vortex thermometer is that it results in a large air drag due to the necessity of providing a scoop to introduce air tangentially into the device and due to the fact that the scoop in this type of device is required to be mounted perpendicularly to the direction of flight.

Accordingly, it is an object of the present invention to provide an improved thermometer adapted for use in aircraft wherein the heating of the air flowing past the plane in flight is compensated for over a wide range of aircraft speeds.

It is another object of this invention to provide an axial flow vortex thermometer wherein the device requires a small frontal area and low air drag.

Another object of the present invention is to provide a vortex type of thermometer adapted to measure fluid temperatures wherein a minimum amount of turbulence of the fluids under study is produced.

It is still another object of this invention to provide a means of determining the true air speed of aircraft utilizing the principle embodied in the axial flow vortex thermometer described herein.

Another object of this invention is to provide an improved flow meter for measuring the rate of flow of fluids.

Other objects and many of the attendant advantages of this invention will be readily appreciated as the same becomes better understood by reference to the following detailed description when considered in connection with the accompanying drawings wherein:

Figure 1 represents a cross sectional view of the present axial flow vortex thermometer shown attached to the body of an aircraft;

Figure 2 represents an enlarged view of an element of the present invention;

Figure 3 is a diagrammatic view of a portion of an aircraft provided with the device shown in Figure 1 and additionally with a conventional temperature sensitive means, whereby the temperatures recorded on the two devices provides an indication of the air speed of the aircraft; and Fig. 4 is a view taken on the line 4—4 of Fig. 1.

With special reference to Figure 1, wherein a typical embodiment of the present device is included, reference number 10 represents the skin of an aircraft on which the present invention is adapted to be mounted. Attached to the airplane at right angles to its surface are a pair of support members 12. To these support members is attached a housing member 14. Member 14 is preferably a hollow metal sleeve having front and rear apertures. Protruding slightly from the front aperture of the housing 14 is a smooth nose piece 16, to which is attached a fixed helical vane member 18. This helical member is snugly fitted within the housing 14 and is preferably attached thereto by means of a set screw 32. At the rearward end of the helical member is a temperature sensitive element 20. A typical example of element 20 is the bulb of a mercury thermometer which is located centrally within chamber 14 to the rear of the helical member and has a perpendicular stem fed through a vane of helical member 18 and support member 12. The indicating portion of the thermometer is contained within the frame of the aircraft, preferably on the instrument dial.

As seen more closely in Figure 2, helical member 18 is so shaped as to provide a gradual angular acceleration of the air flowing into the front opening of the cylindrical housing 14 thus converting the axial air flow into a rotational flow, as the aircraft 10 is in flight. In order to accomplish this effect gradually, the pitch of the helical member is preferably decreased from its forward portion to its rear portion.

Thus, the air which flow axially through the front aperture of cylindrical housing 14 after having been dynamically heated due to the heating effect of the speed of the airplane, is caused to assume a vortical flow with a minimum of turbulence. Due to the Ranque effect, the air in the central portion of the cylindrical housing is cooled. Provision is made to control the cooling to an amount equal to the amount of the dynamic heating. Thus, the temperature to which temperature sensitive element 20 is exposed is the true air temperature that is desired to be measured.

The cooling effect due to the Ranque effect is a function of the size and shape of the nose member 16 and the helical member 18. Specifically, the amount of cooling of the incoming air due to the Ranque effect is a function of the amount of air passing through the housing 14. This amount is controlled by varying the fraction of air that is deflected around the housing by the nose member 16. The magnitude of the cooling effect is also dependent upon the tightness of the spiral formed by the helical member 18 and its relative location within the housing. For the sake of uniformity, the helical member 18 is originally located so that its leading portion is flush with the leading edge of the housing. The shape of the nose piece and the amount of its protuberance from the leading edge of the housing determine the proportion of air permitted to pass through the housing and hence the amount of cooling. Nose members having sharp leading points have been found to be best suited for high speeds whereas flat nose members provide ease in de-icing under icing conditions.

A practical compromise between the flat and sharp shaped nose members is provided in a rounded member having a diameter of approximately 7/16 of an inch and protruding approximately 7/16 of an inch from the forward aperture of the cylindrical chamber. A helical member having a length of approximately 3½ inches, a diameter of approximately 15/16 inches overall and containing two lands has been found to operate successfully with the round nose described above to provide true temperature measurements that are accurate within 0.1 degree centigrade throughout the entire velocity range at least up to 500 miles per hour. The length of the housing member 14 is not very critical and its length in a typical embodiment is approximately 6 inches.

In order to insure that the proper rotational velocity is produced in the air that is permitted to enter the housing 14 without producing turbulent effects, the leading portion of the spiral vane is planar for a distance of approximately one quarter inch. In a typical embodiment, the vane is rotated to produce a gradually increasing rotational effect from front to rear in the manner disclosed in Table I, which shows the approximate average pitch of helical member 18 at various distances from the leading edge.

Table I

| Distance from leading edge: | Approximate average pitch (inches per revolution) |
| --- | --- |
| 0–¼ in. | Infinity |
| ¼–½ in. | 33 |
| ½–1 in. | 13 |
| 1–1½ in. | 3.5 |
| 1½–2 in. | 2.6 |
| 2–2½ in. | 2.0 |
| 2½–3 in. | 1.8 |
| 3–3½ in. | 1.0 |

Since the dynamic heating effect of aircraft flying through air is a function of the velocity of flight, it is possible to utilize the present invention as a means of measuring the true air speed of aircraft by providing an uncompensated thermometer in combination with one that has been compensated by means of the teachings of the present invention in a manner such as shown in Figure 3. Thus, by comparing the dynamically heated temperature, known as the stagnation temperature, of an uncompensated thermometer 24 with the true air temperature measured by temperature sensitive element 20 contained in cylindrical chamber 14 as embodied in the present invention, it is possible to obtain an indication of the true air speed of a plane in flight.

In order to prevent erroneous readings of the temperature of the dynamically heated air due to the deposit and evaporation of water droplets on the temperature sensitive element of thermometer 24 contained within a housing 26, the thermometer 24 is protected from direct contact with the atmosphere by means of a series of baffle plates 28 placed ahead of thermometer 24. Baffle plates 28 preferably comprise a series of walls obliquely disposed with reference to the axis of housing 26 and slightly overlapping the axis. In this manner, water droplets are prevented from reaching the sensitive element of thermometer 24, but the dynamically heated air is free to reach the sensitive element at the heated temperature.

While a right angle bulb thermometer of the alcohol or mercury type is shown in the drawings as the temperature sensitive device, it is understood that this type is shown for illustration only, and that many other types of temperature sensitive devices can be used in lieu thereof. Examples of such other devices are temperature sensitive resistors used as an arm of a Wheatstone bridge, thermocouples, and electronic circuits.

It is understood that while the embodiments described are specifically designed for measuring air temperatures and air speeds associated with aircraft, that this invention is also capable of use with a multitude of devices to measure the temperature and rates of flow of fluids other than air, and for other purposes that are apparent to mechanics skilled in the art.

Obviously many modifications and variations of the present invention are possible in the light of the above teachings. It is therefore understood that the limits of the invention are defined not by the specific description hereinabove disclosed, but by the scope of the appended claims.

The invention described herein may be manufactured and used by or for the Government of the United States of America for governmental purposes without the payment of any royalties thereon or therefor.

What is claimed is:

1. A temperature indicating device comprising a housing member having front and rear apertures through which a fluid whose temperature is to be measured is adapted to be passed, a helical vane member mounted within said housing member and having a gradually decreasing downstream pitch, the axis of said vane member being in substantially the same direction as the rectilinear component of the fluid flow through said housing member, and a temperature sensitive element mounted so as to have a sensitive portion in substantial axial alignment with and downstream from said vane member.

2. A temperature indicating device comprising a housing member having front and rear apertures through which a fluid whose temperature is to be measured is adapted to be passed, a nose member extending forwardly of said front aperture, a helically shaped vane member mounted within said housing member to the rear of said nose member, said vane member having a gradually decreasing downstream pitch, the axis of said vane member being in substantially the same direction as the rectilinear component of the fluid flow through said housing member, and a temperature sensitive element mounted so as to have a sensitive portion in substantial axial alignment with and downstream from said vane member.

3. In apparatus for measuring the true speed of aircraft, a first temperature sensitive element for measuring the air heated by the plane in flight, baffle means for preventing the deposit of water drops on the first temperature sensitive element, a housing member having front and rear apertures adapted to be aligned with the direction of flight of the aircraft, a nose member extending forwardly of said front aperture, a helically shaped member mounted within said housing member to the rear of said nose member and having a gradually decreasing downstream pitch, the axis of said helically shaped member being in substantially the same direction as the rectilinear component of the fluid flow through said housing member, and a second temperature sensitive element mounted so as to have a sensitive portion in substantial axial alignment with and downstream from said helically shaped member.

4. A flow meter comprising a first temperature sensitive element for measuring the temperature of a fluid in motion, a housing member having front and rear apertures axially aligned with the direction of flow of said fluid, a nose member extending forwardly of said front aperture, a helical member mounted within said housing member to the rear of said nose member and having a gradually decreasing downstream pitch, the axis of said helical member being in substantially the same direction as the rectilinear component of the fluid flow through said housing member, and a second temperature sensitive element mounted so as to have a sensitive portion in substantial axial alignment with and downstream from said helical member.

5. A meter for measuring true air speed by means of comparison between dynamic and static air temperatures comprising a first housing member through which a fluid is adapted to be passed, a first temperature sensitive element located in said first housing member, baffle means located within said first housing member and upstream of said first sensitive element for preventing the deposit of water droplets on said first temperature sensitive element, a second housing member having aligned first and second apertures, a nose member mounted so as to extend forwardly of said first aperture, a helical member mounted within said second housing member rearwardly of said nose member, the axis of said helical member being in substantially the same direction as the rectilinear component of the fluid flow through said second housing member, and a second temperature sensitive element mounted so as to have a sensitive portion downstream from said helical member.

6. A temperature indicating device comprising a housing member mounted on a vehicle and having front and rear apertures axially aligned with the direction of movement of said vehicle, a helical vane member mounted within said housing member and having a gradually decreasing downstream pitch, the axis of said vane member being in substantially the same direction as the rectilinear component of the fluid flow through said housing member and a temperature sensitive element mounted so as to have a sensitive portion in substantial axial alignment with and downstream from said vane member.

7. A temperature indicating device comprising a housing member having front and rear apertures through which a fluid whose temperature is to be measured is adapted to be passed, a helical vane member mounted within said housing member and having a gradually decreasing downstream pitch, the axis of said vane member being in substantially the same direction as the rectilinear component of the fluid flow through said housing member, a nose member of adjustable length axially aligned with and extending forwardly of said vane member for a distance such that cooling of the fluid at the center of the induced vortex is substantially equivalent to the dynamic heating of the fluid, and a temperature sensitive element mounted as to have a sensitive portion in substantial axial alignment with and downstream from said vane member to measure the temperature of the fluid at the center of the induced vortex.

References Cited in the file of this patent

UNITED STATES PATENTS

| | | |
|---|---|---|
| 1,536,461 | Wadsworth | May 5, 1925 |
| 1,952,281 | Ranque | Mar. 27, 1934 |
| 1,971,534 | Piece | Aug. 28, 1934 |
| 2,178,422 | Heagney | Oct. 31, 1939 |
| 2,637,408 | Yadoff | May 5, 1953 |

OTHER REFERENCES

Vonnegut: Review of Scientific Instruments, vol. 21, No. 2, February 1950, pp. 136–141.